(12) United States Patent
Newman et al.

(10) Patent No.: US 12,069,071 B2
(45) Date of Patent: Aug. 20, 2024

(54) METHODS FOR PROVIDING MALWARE PROTECTION FOR CLOUD STORAGE AND DEVICES THEREOF

(71) Applicant: Cloud Storage Security, Pittsford, NY (US)

(72) Inventors: Aaron C. Newman, Pittsford, NY (US); Edward Casmer, Sandy, UT (US); David Dreyer, Pittsford, NY (US)

(73) Assignee: CLOUD STORAGE SECURITY, Pittsford, NY (US)

( * ) Notice: Subject to any disclaimer, the term of this patent is extended or adjusted under 35 U.S.C. 154(b) by 169 days.

(21) Appl. No.: 16/996,672

(22) Filed: Aug. 18, 2020

(65) Prior Publication Data
US 2022/0060488 A1    Feb. 24, 2022

(51) Int. Cl.
*H04L 9/40*    (2022.01)

(52) U.S. Cl.
CPC ........ *H04L 63/1425* (2013.01); *H04L 63/145* (2013.01); *H04L 63/205* (2013.01)

(58) Field of Classification Search
CPC . H04L 63/1425; H04L 63/145; H04L 63/205; G06F 21/562
See application file for complete search history.

(56) References Cited

U.S. PATENT DOCUMENTS

| | | | | |
|---|---|---|---|---|
| 8,631,330 B1* | 1/2014 | Hwang | ................. | G06F 21/629 715/708 |
| 9,104,859 B1* | 8/2015 | Banerjee | ............. | H04L 63/1408 |
| 9,990,497 B2* | 6/2018 | Spernow | ............... | G06F 21/562 |
| 11,281,755 B2* | 3/2022 | Chang | .................... | G06V 40/50 |
| 2006/0168230 A1* | 7/2006 | Caccavale | ............. | H04L 41/145 709/217 |
| 2006/0236392 A1* | 10/2006 | Thomas | ................ | G06F 21/577 726/23 |
| 2012/0084859 A1* | 4/2012 | Radinsky | ................ | G06F 21/56 707/E17.046 |
| 2012/0216190 A1* | 8/2012 | Sivak | .................... | G06F 21/562 718/1 |
| 2013/0269028 A1* | 10/2013 | Nakawatase | ........ | H04L 63/1433 726/22 |
| 2018/0189488 A1* | 7/2018 | Arora | .................... | G06F 21/562 |

(Continued)

OTHER PUBLICATIONS

"What is a Container?", https://www.docker.com/resources/what-container, last accessed Aug. 21, 2020.

(Continued)

*Primary Examiner* — Ali S Abyaneh
(74) *Attorney, Agent, or Firm* — Troutman Pepper Hamilton Sanders LLP

(57) ABSTRACT

A method, non-transitory computer readable medium, and device that provides an externally deployable malware protection architecture comprising one or more anti-malware engines for malware inspection of one or more files within a cloud storage environment. The one of the files is tested to detect for any malware by an executing one of the anti-malware engines supported by one or more anti-malware libraries. At least one of a plurality of actions on the at least one file is executed when the test indicates the detection of malware in the at least one of the files.

24 Claims, 5 Drawing Sheets

(56) References Cited

U.S. PATENT DOCUMENTS

2019/0138727 A1* 5/2019 Dontov .............. G06F 11/1458
2021/0326439 A1* 10/2021 Hoang ................. G06F 21/562

OTHER PUBLICATIONS

"Computer Virus", https://en.wikipedia.org/wiki/Computer_virus, last accessed Aug. 21, 2020.
"Malware", https://en.wikipedia.org/wiki/Malware, last accessed Aug. 21, 2020.
"Cloud Workload Protection", Symantec: https://www.broadcom.com/products/cyber-security/endpoint/hybrid-cloud/cloud-workload-protection (look for the storage words), last accessed Aug. 21, 2020.
"Antivirus for S3 buckets", Widdix: https://s3-virusscan.widdix.net/, last accessed Aug. 21, 2020.
JS4 User Guide: https://js4-docs.jptec.co/, last accessed Aug. 21, 2020.

\* cited by examiner

METHODS FOR PROVIDING MALWARE PROTECTION FOR CLOUD STORAGE AND DEVICES THEREOF

FIELD

This technology relates to methods and devices that provide malware protection for cloud storage.

BACKGROUND

A massive amount of IT infrastructure has been built and managed in proprietary data centers. Every company has had to build and manage physical computers, storage devices, network devices, power sources, server rooms, cooling systems, and even fire suppression systems. This is similar to how power plants were built in the 1700 s and 1800 s. Prior to the Industrial Revolution, if you had a factory you would need to locate your factory near a river to provide a source for power. Some people used coal or wood to fuel steam-engines to create power. These techniques were highly inefficient. As the Industrial Revolution evolved and technology matured, a new concept emerged—shared power plants. A similar evolution is now happening in the IT industry.

The last forty years has been spent building these proprietary data centers. Initially, each company or other entity had to build and manage their own data center which led to huge inefficiencies and massive fluctuations in the quality, robustness, and security of each data center. Over time, a better alternative has emerged—the public cloud.

With respect to the development of public cloud storage environments, a small number of companies and services have risen to the top, namely Amazon Web Services, Microsoft Azure, and the Google Cloud Platform, each providing unlimited access to compute, network, and storage at a high level of quality, robustness, and security. Their strategy is to invest hundreds of billions of dollars into building shared data centers. On top of this, they have created a flexible and robust API to turn physical devices into virtual devices that can be rented, configured, used, and then unrented, in a matter of seconds. These clouds use best practices including being geographically dispersed around the globe and are created as "infinitely" scalable systems. They have taken the complication of physical security, fire suppression systems, power management, and hundreds of other tasks out of the hands of the consumers of IT. These three companies have been and continue to iterate over and over on these data centers allowing them to build a level of experience and expertise that would be impossible for a single company to acquire. All these advantages are available now at a fraction of the price to both the smallest startup and the largest enterprise.

As a result of the development of these public cloud storage environments, there is an ongoing migration of IT infrastructure out of the company managed data center to these public cloud storage environments. It will take decades to move the majority of it, but clearly more and more IT is moving to the cloud each month. As a result, this new storage dynamic requires new strategies for managing this IT, including how to effectively detect viruses and malware in files being uploaded into this new cloud storage environment.

Computer malware and viruses are rampant and an everyday fact of doing business and poses new and unique challenges for managing security in these public cloud storage environments. The term malware encompasses computer viruses along with many other forms of malicious software, such as computer "worms", ransomware, spyware, adware, Trojan horses, keyloggers, rootkits, bootkits, malicious Browser Helper Object (BHOs), and other malicious software. The majority of active malware threats are actually Trojan horse programs or computer worms rather than computer viruses. The phrase computer virus is a type of computer program that, when executed, replicates itself by modifying other computer programs and inserting its own code. When this replication succeeds, the affected areas are then said to be "infected" with a computer virus.

Historically malware has been delivered through email, web, or even file sharing through network shares. The threat has evolved to include a new attack vector of uploading infected files to cloud storage. As discussed above, users and applications have come to rely on public cloud storage environments to provide storage of critical business data. As a result, more malware is finding its way to cloud storage and approaches for effectively and efficiently managing security of new and existing files in these public cloud storage environments have met with limited success to date.

SUMMARY

An example of a method for providing malware protection for cloud storage includes providing, by a computing device, a deployable malware protection architecture comprising one or more anti-malware engines for malware inspection of one or more files within a cloud storage environment. The one of the files is tested, by the computing device, to detect for any malware by an executing one of the anti-malware engines supported by one or more anti-malware libraries. At least one of a plurality of actions on the at least one file is executed, by the computing device, when the test indicates the detection of malware in the at least one of the files.

An example of a non-transitory computer readable medium having stored thereon instructions comprising executable code that, when executed by one or more processors, causes the one or more processors to provide a deployable malware protection architecture comprising one or more anti-malware engines for malware inspection of one or more files within a cloud storage environment. The one of the files is tested to detect for any malware by an executing one of the anti-malware engines supported by one or more anti-malware libraries. At least one of a plurality of actions on the at least one file is executed when the test indicates the detection of malware in the at least one of the files.

An example of a cloud storage malware detection device comprising memory comprising programmed instructions stored thereon and one or more processors configured to be capable of executing the stored programmed instructions to provide a deployable malware protection architecture comprising one or more anti-malware engines for malware inspection of one or more files within a cloud storage environment. The one of the files is tested to detect for any malware by an executing one of the anti-malware engines supported by one or more anti-malware libraries. At least one of a plurality of actions on the at least one file is executed when the test indicates the detection of malware in the at least one of the files.

This technology provides a number of advantages including providing methods, non-transitory computer readable media and devices that enable malware detection and protection for cloud storage. In particular, examples of this technology are able to check each file as uploaded to a cloud storage environment and also can review existing files already within the cloud storage environment for malware. Additionally, examples of this technology are advantageously configured to run one or more anti-malware engines each as a software container or other computing container to detect malware which provides isolation and also enables easy scaling of the anti-malware engines as needed to analyze files. Further, examples of this technology enable actions, such as automated security mitigation actions and/or one or more directed notifications regarding when a particular file is infected, such as to security information and event management (SIEMs) or to workflow software, such as ServiceNow, Splunk, or ZenDesk, which previously was not possible within a cloud storage environment. Examples of this technology also generate and provide a dashboard that conveniently provides a real time status and results of checks of files in cloud storage environments for malware.

DETAILED DESCRIPTION

Figure 1:
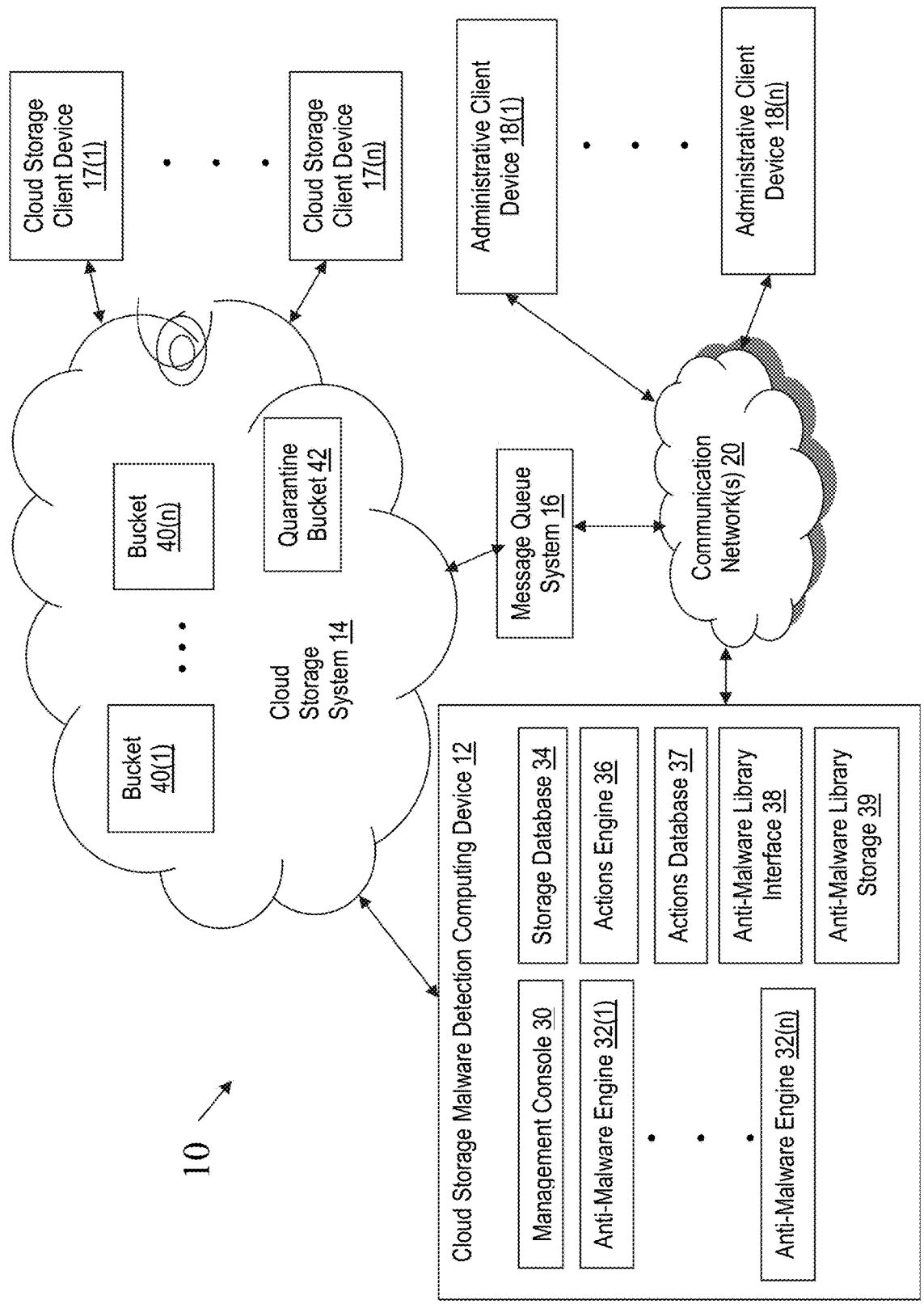
FIG. 1 is a block diagram of an exemplary system with a cloud storage malware detection device.
Figure 2:
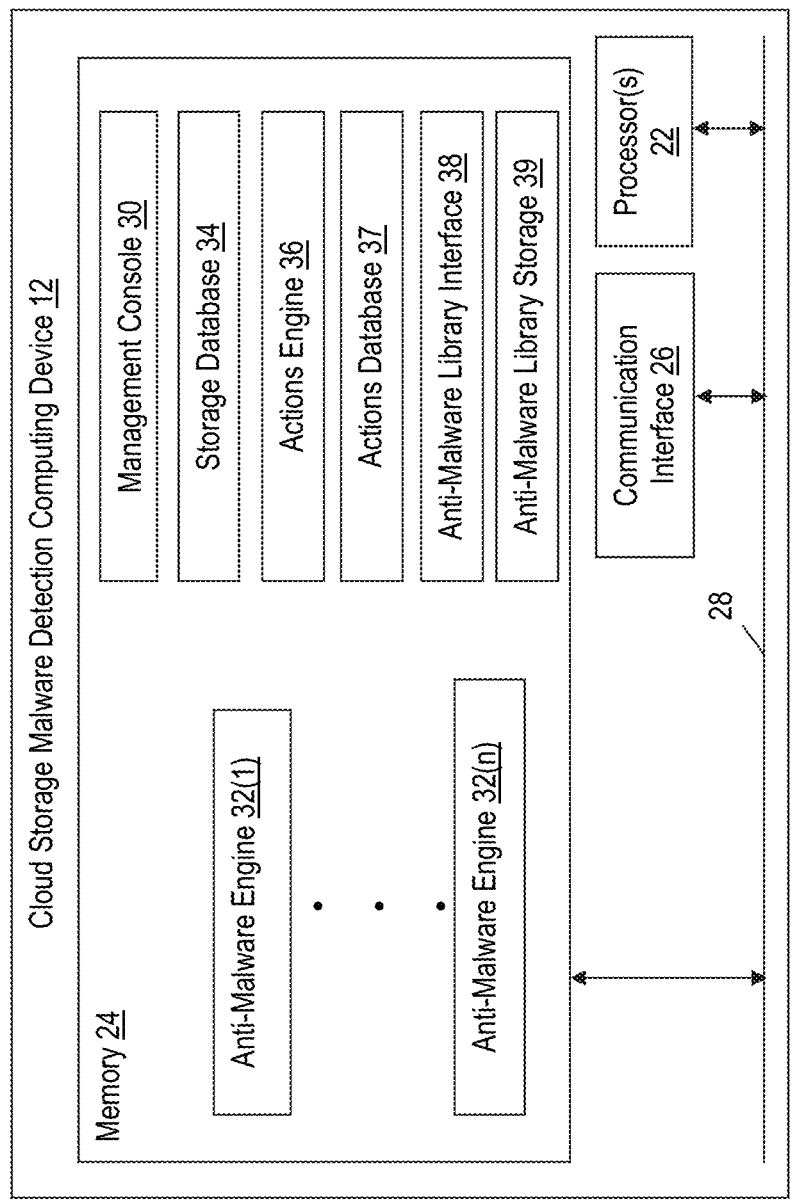
FIG. 2 is a block diagram of an exemplary cloud storage malware detection device.

A system 10 with a cloud storage malware detection device 12 is illustrated in FIGS. 1-2. In this example, the system 10 includes the cloud storage malware detection device 12, a cloud storage system 14, a message queue system 16, cloud storage client computing devices 17(1)-17(n), and administrative client devices 18(1)-18(n) via one or more other communication network(s) 20, although the system 10 may include other types and/or numbers of other systems, devices, components, or other elements in other configurations. This technology provides a number of advantages including providing methods, non-transitory computer readable media, and devices that enable effective detection of malware within a cloud storage environment.

In this particular example, the cloud storage malware detection device 12 is disclosed in FIG. 1 as a hardware device, however the cloud storage malware detection device 12 can also be implemented in other manners, such as virtually and/or in software within one or more other devices in the system. By way of example only, the cloud storage malware detection device 12 can be partially or entirely hosted by one or more of the administrative client devices 18(1)-18(n), although other configurations can be used.

Referring to FIGS. 1-2, the cloud storage malware detection device 12 of the system 10 may perform any number of operations and other functions as illustrated and described by way of the examples herein, including providing inventorying and enabling detection of malware within a cloud storage environment. The cloud storage malware detection device 12 in this example includes a processor(s) 22, a memory 24, and a communication interface 26, which are coupled together by a bus 28, although the cloud storage malware detection device 12 can include other types or numbers of elements in other configurations.

The processor(s) 22 of the cloud storage malware detection device 12 may execute programmed instructions stored in the memory 24 of the cloud storage malware detection device 12 for any number of functions described and illustrated by way of the examples herein, including providing inventorying and malware protection for files within a cloud storage environment. The processor(s) 22 of the cloud storage malware detection device 12 may include one or more central processing units (CPUs) or general purpose processors with one or more processing cores, for example, although other types of processor(s) can also be used.

The memory 24 of the cloud storage malware detection device 12 stores these programmed instructions for aspect(s) of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Figure 3:
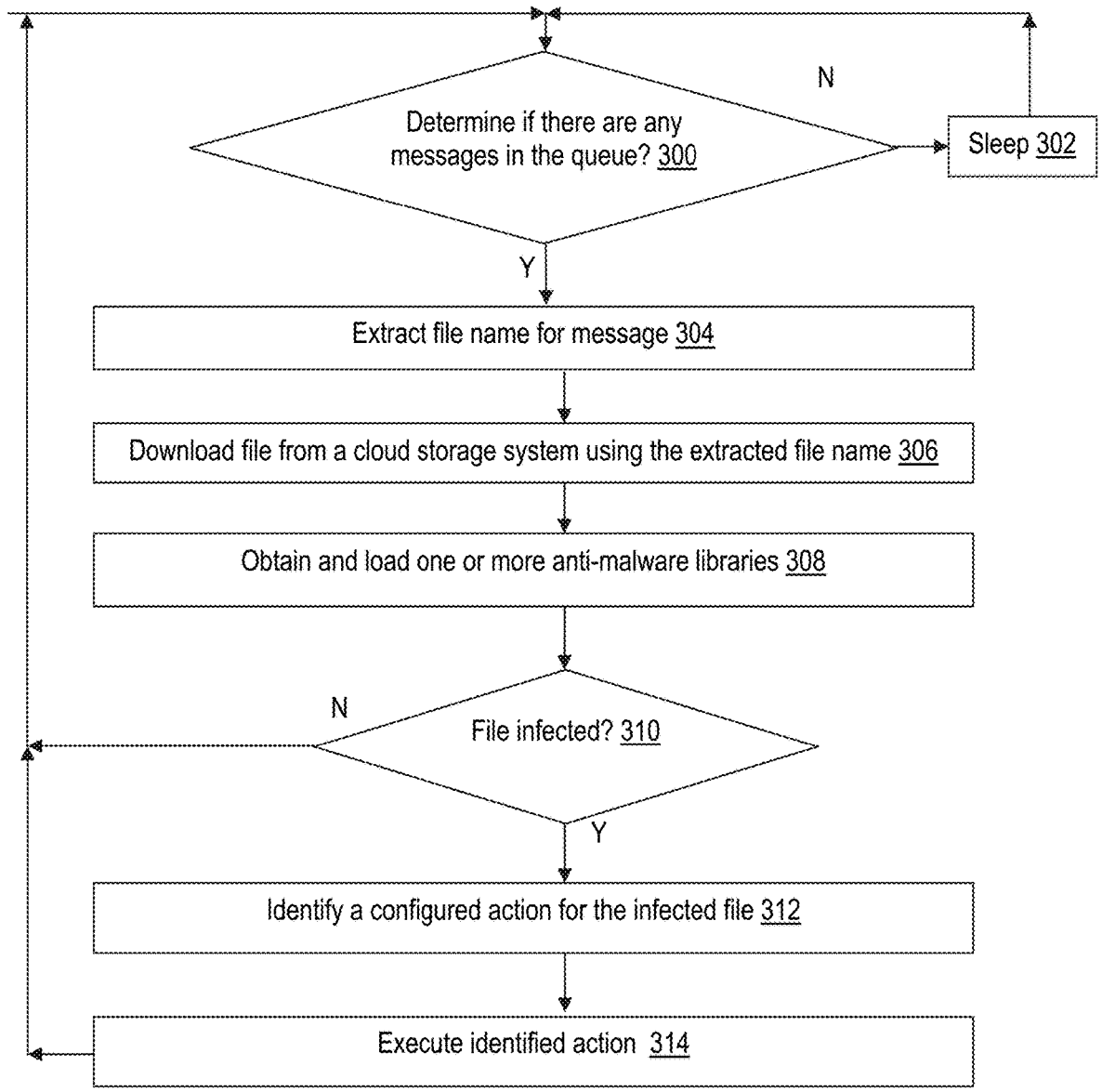
FIG. 3 is a flowchart of an exemplary method for providing malware protection for cloud storage.
Figure 4:
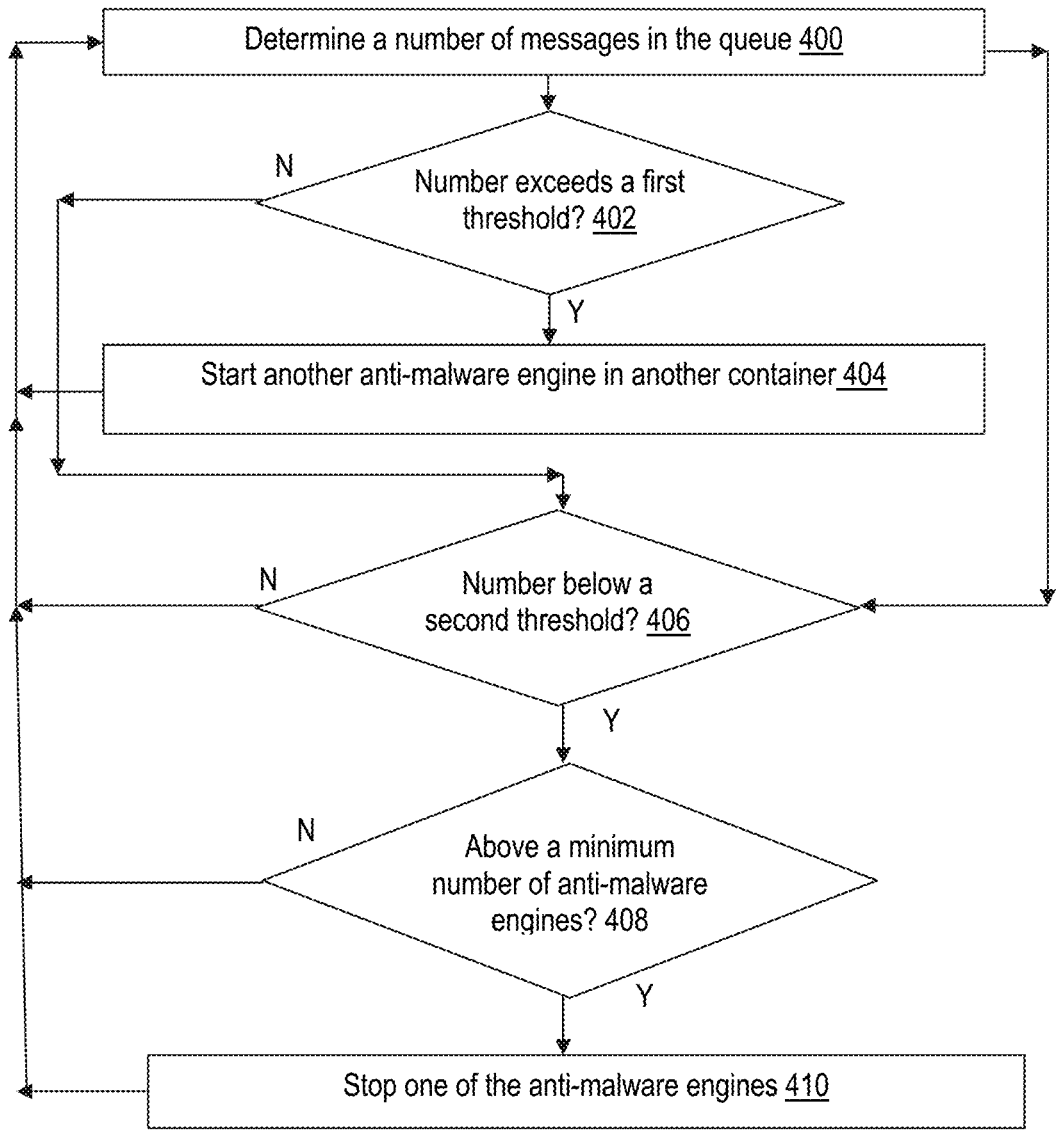
FIG. 4 is a flow chart of an exemplary method for scaling anti-malware engines.
Figure 5:
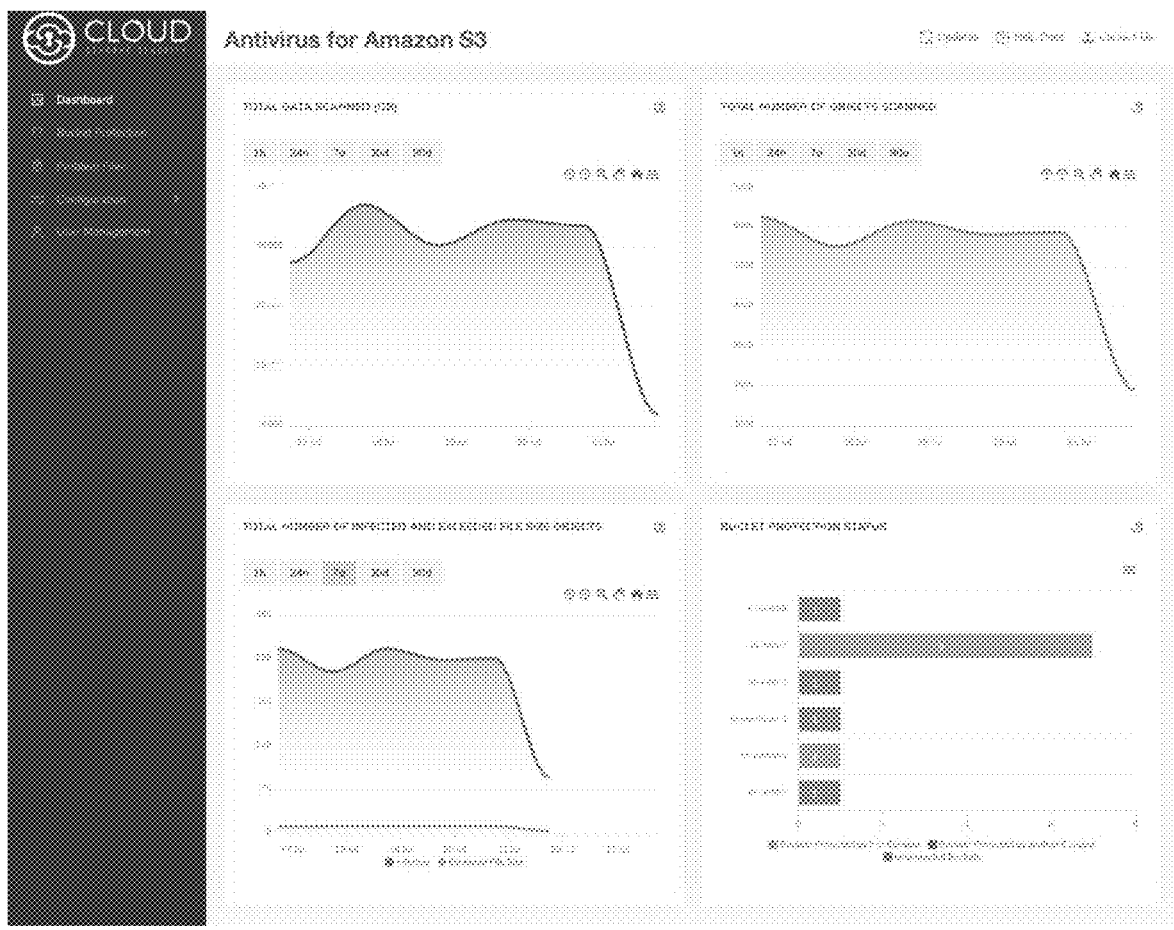
FIG. 5 is a screen shot of an example of generated dashboard used to monitor a real time status and results of scanned files within a cloud storage environment for any malware.

Accordingly, the memory 24 of the cloud storage malware detection device 12 can store database(s), module(s), engine(s), and/or other program(s) that can include computer executable instructions that, when executed by the cloud storage malware detection device 12, cause the cloud storage malware detection device 12 to execute instructions or perform other operations as described and illustrated by way of the examples herein, including those described and illustrated with respect to FIGS. 3-5. The module(s), engine(s), and/or other program(s) can be implemented as components of other module(s), engine(s), and/or program(s). Further, the module(s), engine(s), and/or other program(s) can be implemented as applications, operating system extensions, plugins, or the like.

Even further, the module(s), engine(s), and/or other program(s) may be operative in a cloud-based computing environment. The module(s), engine(s), and/or other program(s) can be executed within or as virtual machine(s) or virtual server(s) that may be managed in a cloud-based computing environment. Also, the module(s), engine(s), and/or program(s), and even the cloud storage malware detection device 12 itself, may be located in virtual server(s) running in a cloud-based computing environment rather than being tied to specific physical network computing device(s). Also, the module(s), engine(s), and/or other program(s) may be running in one or more virtual machines (VMs) or in one or more other computing apparatuses.

In this particular example, the memory 24 of the cloud storage malware detection device 12 also includes a management console 30, anti-malware engines 32(1)-32(n), a storage database 34, an actions engine 36, an actions database 37, an anti-malware library interface 38, and an anti-malware library storage 39, although the memory 24 can include other consoles, modules, engines, programs, policies, rules, data, and/or other information, for example.

In this example, the management console 30 is configured to manage inventorying and also detection of malware within a cloud storage environment, although the management console 30 could be configured in other manners and for other types and/or numbers of other operations or other actions. Additionally, in this example, the management console 30 runs on a single software container and queries a public cloud API for the cloud storage system 14 to retrieve a list of the bucket names for buckets 40(1)-40(n), although the management console 30 can interact with other numbers of cloud storage systems. Additionally, with this example, a user may use the management console 30 to choose one or more buckets 40(1)-40(n) within the cloud storage system 14 to protect from malware. Further, in this example configuration of malware detection and protection is made through the management console 30. The management console 30 also may contain and provide an interactive dashboard rendered through the cloud storage malware detection device 12 through which real time statistics on files processed, infected files, actions initiated on the infected files and errors may be presented in charts within the dashboard as illustrated by way of example in FIG. 5 and enable other types of interaction with the data, such as enabling a review of one or more of the infected files. The dashboard data may also be displayed by the management console 30 for requested historical periods of time. In this example, the management console 30 may also be used to set a name of the anti-malware library storage 39 used by the anti-malware library interface 38 and to identify or otherwise select one or more anti-malware libraries that may be stored in anti-malware library storage 39 and used to support one or more of the anti-malware engines 32(1)-32(n). Additionally, in this example the anti-malware library interface 38 may receive the file to be scanned from the cloud storage system 14 and hand the file to the executing one of the anti-malware engines 32(1)-32(n) configured to run in a separate software container.

In this example, the anti-malware engines 32(1)-32(n) are advantageously configured to each run in a separate software container, although one or more of the anti-malware engines 32(1)-32(n) could be configured to run within an existing software container or other computing container in an alternative implementation. By using software or other computing containers, multiple instances of the anti-malware engines 32(1)-32(n) can be easily scaled up and down as needed and may be simultaneously run to test multiple files concurrently to verify large numbers of files already stored, and to process a large number of files that are being uploaded at a high rate.

In this example, the storage database 34 is used to store files and/or other data needed during the process of detecting malware within a cloud storage environment, although the storage database 34 could be configured for other types and/or numbers of other security operations or other actions.

In this example, the actions engine 36 is used to execute one or more actions identified from the actions database 37 for a file identified to have any malware, although the actions engine 36 could be configured for other types and/or numbers of other operations or other actions and/or the actions may be stored in other locations and/or obtained in other manners, such as from one of the administrative computing devices 18(1)-18(n). The one or more actions may comprise programmed instructions for one or more security mitigation actions and/or one or more directed notifications related to the file identified to have any malware, although other types of actions or other operations may be stored. By way of example only, the one or more security mitigation actions may comprise placing the infected file in the quarantine bucket 42 within the cloud storage system 14, executing an anti-malware program to clean the infected file, or running an AWS Lambda® function (An AWS Lambda® function is an event-driven, serverless computing platform provided by Amazon® as a part of Amazon Web Services® that runs code in response to events and automatically manages the computing resources required by that code) or other type of executable function. Additionally, by way of example the one or more directed notifications may comprise running an application program interface to initiate generation of a ticket in a ticketing system to address the infected file or generate and transmit a notification or other electronic message to a designated end point(s).

In this example, the anti-malware library interface 38 is used to efficiently and effectively load one or more anti-malware libraries into anti-malware library storage 39 to enable one or more of these loaded anti-malware libraries to be used to support identification of any malware in any of the files by one or more of the anti-malware engines 32(1)-32(n), although other manners for obtaining and storing the one or more anti-malware libraries may be used. With this exemplary configuration, the anti-malware library interface 38 may also advantageously be used to identify and obtain one or more anti-malware libraries from a variety of different sources allowing for customization of the anti-malware libraries and for selection of one or more of the anti-malware libraries for use in malware detection.

The communication interface 26 of the cloud storage malware detection device 12 operatively couples and communicates between the cloud storage malware detection device 12 and the cloud storage system 14, the message queue system 16, the cloud storage client computing devices 17(1)-17(n), and the administrative client devices 18(1)-18(n) which are coupled together at least in part by one or more other communication network(s) 20, although other types and/or another number of communication networks or systems with other types and/or another number of connections and/or configurations to other devices and/or elements can also be used.

By way of example only, one or more communication network(s) 20 can include local area network(s) (LAN(s)) or wide area network(s) (WAN(s)), and can use TCP/IP over Ethernet and industry-standard protocols, although other types or numbers of protocols or communication networks can be used. The one or more communication network(s) 20 in this example can employ any suitable interface mechanisms and network communication.

While the cloud storage malware detection device 12 is illustrated in this example as single device, the cloud storage malware detection device 12 in other examples can include a plurality of devices or instances each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the cloud storage malware detection device 12.

The cloud storage system 14 is a public cloud storage environment which is managed as buckets 40(1)-40(n) which are the logical containers for one or more files or other data and a quarantine bucket 42 which may be used for any files or other data infected with malware, although other types and/or numbers of cloud storage environments may be used. In this example, the buckets 40(1)-40(n) within the cloud storage system 14 are assigned logical names and permissions and configure settings may be assigned at the bucket level within the cloud storage system 14. Further, in this example there is no storage limit for each of the buckets 40(1)-40(n) which each can contain folders. In the examples illustrated and described herein a single cloud storage system 14 is illustrated, however examples of the claimed technology may work with other types of cloud storage systems.

The message queue system 16 in this example is a physical server on which a queue of messages relating to any files being uploaded to or existing in one or more buckets 40(1)-40(n) in cloud storage system 14, although the message queue system 16 can be configured different, e.g. virtually, and other strategies to identify and process files for inventorying and detecting malware can be used. In this example, the message queue system 16 stores a continually updated list of files being uploaded to or existing in one or more buckets 40(1)-40(n) in cloud storage system 14 which are then being pulled from the list for processing as illustrated and described by way of the examples herein. Additionally, the message queue system 16 may maintain a count of the number of message in the queue.

The cloud storage client devices 17(1)-17(n) in this example include any type of computing device that can exchange network data, such as mobile, desktop, laptop, or tablet computing devices, virtual machines (including cloud-based computers), and the like. In this example, each of the cloud storage client devices 17(1)-17(n) may upload one or more files to one or more buckets 40(1)-40(n) in cloud storage system 14. Additionally, in this example each of the cloud storage client devices 17(1)-17(n) includes a processor, a memory, and a communication interface, which are coupled together by a bus or other communication link, although other types and/or another number of components could also be used. Each of the cloud storage client devices 17(1)-17(n) may further include a display device, such as a display screen or touchscreen, or an input device, such as a keyboard for example The administrative client devices 18(1)-18(n) in this example include any type of computing device that can exchange network data, such as mobile, desktop, laptop, or tablet computing devices, virtual machines (including cloud-based computers), and the like. In this example, each of the administrative client devices 18(1)-18(n) may receive directed notifications or other real time data on, for example, the malware status of files in one or more of the buckets 40(1)-40(n) within the cloud storage system 14, such as via the dashboard shown in FIG. 5 by way of example only. Each of the administrative client devices 18(1)-18(n) includes a processor, a memory, and a communication interface, which are coupled together by a bus or other communication link, although other types and/or another number of components could also be used. Each of the administrative client devices 18(1)-18(n) may further include a display device, such as a display screen or touchscreen, or an input device, such as a keyboard for example.

Although the exemplary system 10 with the cloud storage malware detection device 12, the cloud storage system 14, the message queue system 16, the cloud storage client computing devices 17(1)-17(n), and the administrative client devices 18(1)-18(n) and/or one or more of the communication network(s) 20 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted within the cloud storage system 14, may be configured to operate as virtual instances on the same physical machine. Additionally, there may be more or fewer apparatuses, devices, or other elements than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, PDNs, the Internet, intranets, and combinations thereof.

The examples also may be embodied as one or more non-transitory computer readable media, such as the memory 24 of the cloud storage malware detection device 12, having instructions stored thereon for aspect(s) of the present technology, as described and illustrated by way of the examples herein. The instructions in some examples include executable code that, when executed by one or more processors, such as the processor(s) 22 of the cloud storage malware detection device 12, cause the processors to carry out steps necessary to implement the methods of the examples of this technology that are described and illustrated herein.

An exemplary method for providing malware protection for cloud storage will now be described with reference to FIGS. 1-3. Referring more specifically to FIG. 3, in step 300 in this example, the cloud storage malware detection device 12 determines if there are any messages in the message queue system 16 for the cloud storage system 14. In this example, the message queue system 16 maintains data on the messages in the queue including a current number or count, although other types of information may be maintained. Additionally, in this example the messages in the message queue system 16 may relate to one or more files currently being uploaded to one or more buckets 40(1)-40(n) within the cloud storage system 14, although other examples of this technology may be used to check an existing set of files already in one or more buckets 40(1)-40(n) within the cloud storage system 14. In this alternative example used to check an existing set of files, one or more of the anti-malware engine 32(1)-32(n) may call a cloud API for the cloud storage system 14 to enumerate all objects in one or more buckets 40(1)-40(n) and then a reference to each of those objects is pushed onto a queue in the message queue system 16.

If in step 300 the cloud storage malware detection device 12 determines there no any messages in the message queue system 16, then the No branch is taken to step 302. In step 302 the cloud storage malware detection device 12 may enter a sleep phase for a stored or otherwise set period of time before returning to step 300.

If in step 300 the cloud storage malware detection device 12 determines there are one or more messages in the message queue system 16, then the Yes branch is taken to step 304. In step 304, one of the anti-malware engines 32(1)-32(n) in the cloud storage malware detection device 12 extracts a file name from one of the one or more messages in the message queue system 16.

In step 306, one of the anti-malware engines 32(1)-32(n) in the cloud storage malware detection device 12 downloads one of the files from one of the buckets 40(1)-40(n) based on the extracted file name and hands the file off to an anti-malware library interface 38 of the cloud storage malware detection device 12, although other manners for obtaining files may be used.

In step 308, in this example the cloud storage malware detection device 12 with the anti-malware library interface 38 obtains and loads one or more anti-malware libraries for the file into the anti-malware library storage 39 for use by one of the anti-malware engines 32(1)-32(n) operating in a separate software container, although the one or more anti-malware libraries may be identified and/or obtained in other manners and/or from other sources. Additionally, in this example an operator using the management console 30 in the cloud storage malware detection device 12 may adjust one or more of the anti-malware libraries that are obtained with the anti-malware library interface 38 and stored in the anti-malware library storage 39 for use by one of the anti-malware engines 32(1)-32(n) operating in a separate software container.

In step 310, one of the anti-malware engines 32(1)-32(n) executed by the cloud storage malware detection device 12 to run in a separate software container and supported by the obtained one or more of the anti-malware libraries 39 determines if the downloaded file is infected with any malware. Although in this example, one file is being processed, as described with reference to FIG. 4 examples of this technology monitor a number of messages in the queue in message queue system 16 and depending on the number of files enumerated in the queue, additional ones of the anti-malware engines 32(1)-32(n) may be added or removed as needed. For example, when the queue in message queue system 16 is backed up and above a first set or stored threshold then additional ones of the anti-malware engines 32(1)-32(n) may be added and when the queue in message queue system 16 is no longer backed up, e.g. with respect to a stored or otherwise set second threshold and the number of executing anti-malware engines 32(1)-32(n) is above a set or stored minimum number, then the number of anti-malware engines 32(1)-32(n) is reduced.

If in step 310 the cloud storage malware detection device 12 determines the downloaded file is not infected with any malware, then the No branch is taken back to step 300 to proceed as described earlier. The cloud storage malware detection device 12 may record the status of the inspection of the file in storage database 34 and also may update a real time dashboard with the current malware status of this file, as illustrated by way of example in FIG. 5.

If in step 310 the cloud storage malware detection device 12 determines the downloaded file is infected with any malware, then the Yes branch is taken to step 312. When the file is discovered to have malware in the file, the file may be marked as "infected" by the cloud storage malware detection device 12 and this status may be stored in storage database 34 and may be updated in real time in the dashboard shown in FIG. 5 by way of example.

In step 312 the cloud storage malware detection device 12 may identify one or more actions from the actions engine 36 to execute on the file, although other manners for determining one or more actions to initiate may be used. As described earlier, the one or more identified actions may comprise programmed instructions for one or more security mitigation actions and/or one or more directed notifications related to the file identified to have any malware. By way of example only, the one or more security mitigation actions may comprise placing the infected file in the quarantine bucket 42 within the cloud storage system 14 and deleting the file from the corresponding one of the buckets 40(1)-40(n), deleting the file from the corresponding one of the buckets 40(1)-40(n) and not moving the file into the quarantine bucket 42, taking no action with respect to the infected file other than creating a notification that the file is infected, executing an anti-malware program to clean the infected file, or running an AWS Lambda® function or other executable function to manage the infected file. Additionally, by way of example the one or more directed notifications may comprise running an application program interface associated with the infected file to initiate generation of ticket in a ticketing system to address the infected file or generating and transmitting a notification or other electronic message to a designated end point(s) associated with the infected file. The management console 30 of the cloud storage malware detection device 12 may also be used to configure and further customize one or more of these actions.

In step 314, the actions engine 36 in the cloud storage malware detection device 12 may execute the one or more identified action for the downloaded filed that is infected with malware and then may go back step 300 to as described earlier.

Accordingly, as illustrated and described by way of the example above, this technology provides an infrastructure which enables verification that files or objects being uploaded into cloud storage systems or files already in cloud storage systems do not contain computer viruses or malware software, such as Trojan horses or backdoors by way of example. This technology advantageously operates each of the anti-malware engines 32(1)-32(n) in a separate software container and may increase or decrease the number of executing anti-malware engines 32(1)-32(n) in separate software containers as needed based on the current count in the queue or other monitoring system.

In an alternative implementation, an example of the claimed technology may be used as a proxy for uploading files, rather than writing files directly from one of the cloud storage client devices 17(1)-17(n) into the cloud storage system 14. In this alternative implementation, the file may first be sent from one of the cloud storage client devices 17(1)-17(n) to one of the anti-malware engines 32(1)-32(n) in cloud storage malware detection device 12 acting as the proxy which checks for malware and viruses. Once the check is completed, the one of the anti-malware engines 32(1)-32(n) can then upload the files to the cloud storage system 14 or can simply respond to the one of the cloud storage client devices 17(1)-17(n) with a verdict of whether the file is infected or not which can then upload the file to the cloud storage system 14.

In another alternative implementation, an example of the claimed technology may be offered as SaaS (Software as a Service). In this implementation, a user would not run their own version of an example of the claimed technology, but would create an account on a multi-tenanted instance of an example of the claimed technology running by a SaaS provider. Malware detection would run in the same way as illustrated and described by way of the examples herein, but would be run outside the cloud account of the user. This would require the user to grant permissions to access the cloud storage system 14 to the SaaS provider.

An exemplary method for scaling anti-malware engines is illustrated in FIG. 4. As described earlier, examples of this technology monitor a number of messages in the queue in message queue system 16 and depending on the number of files enumerated in the queue, additional ones of the anti-malware engines 32(1)-32(n) may be created. When the queue in message queue system 16 is no longer backed up, e.g. with respect to stored or otherwise set thresholds, then the number of anti-malware engines 32(1)-32(n) is reduced. An example of this aspect is illustrated and described below.

Referring more specifically to FIG. 4, in this example in step 400 the cloud storage malware detection device 12 may determine a number of messages currently in the message queue system 16, although other manners for monitoring a number of messages and/or files that currently need to be processed for malware detection may be used.

In step 402, in this example the cloud storage malware detection device 12 determines if the number of messages in the message queue system 16 exceeds a first stored or otherwise set threshold. If in step 402 the cloud storage malware detection device 12 determines the number of messages in the message queue system 16 exceeds a first threshold, then the Yes branch is taken to step 404.

In step 404, the cloud storage malware detection device 12 starts another one of the anti-malware engine **32(1)-32(*n*) executing in another software container which may be used to start to download and inspect files identified based on messages in the message system queue 16 and returns back to step 400** as described earlier.

If back in step 402 the cloud storage malware detection device 12 determines the number of messages in the message queue system 16 does not exceed the first threshold, then the No branch is taken to back to step 400 as described earlier.

Meanwhile after determining a number of messages in the queue in step 400, in step 406 the cloud storage malware detection device 12 determines if the previously determined number of messages in the message queue system 16 is below a second stored or otherwise set threshold. If in step 406, the cloud storage malware detection device 12 determines the previously determined number of messages in the message queue system 16 is not below the second threshold, then the No branch is taken to back to step 400 as described earlier.

If in step 406, the cloud storage malware detection device 12 determines the previously determined number of messages in the message queue system 16 is below the second threshold indicating the currently executing ones of the anti-malware engines **32(1)-32(*n*) have been effectively reducing the number in the queue in message queue system 16, then the yes branch is taken to step 408**

In step 408, the cloud storage malware detection device 12 determines if the number of currently executing ones of the anti-malware engines **32(1)-32(*n*) is above a minimum stored or otherwise set number, such as a minimum number of one executing anti-malware engine by way of example only. If in step 408 the cloud storage malware detection device 12 determines the number of currently executing ones of the anti-malware engines 32(1)-32(*n*) is not above the minimum number, then the No branch is taken back to step 400** as described earlier.

If in step 408 the cloud storage malware detection device 12 determines the number of currently executing ones of the anti-malware engines **32(1)-32(*n*) is above the minimum number, then the Yes branch is taken to step 410. In step 410, the cloud storage malware detection device 12 stops one of the currently executing anti-malware engines 32(1)-32(*n*) and then returns to step 400** as described earlier.

Accordingly, as illustrated and described by way of the examples herein, examples of the claimed technology provide a number of advantages including providing methods, non-transitory computer readable media and devices that enable effective detection of malware within a cloud storage environment. In particular, examples of this technology are able to check each file as uploaded to a cloud storage environment and also can review existing files already within the cloud storage environment for malware. Additionally, examples of this technology are advantageously configured to run one or more anti-malware engines each as a software container to detect malware which provides isolation and also enables easy scaling of the anti-malware engines as needed to analyze files. Further, examples of this technology enable actions, such as automated security mitigation actions and/or one or more directed notifications regarding when a particular file is infected, such as to security information and event management (SIEMs) or to workflow software, such as ServiceNow, Splunk, or ZenDesk, which previously was not possible within a cloud storage environment. Examples of this technology also generate and provide a dashboard that conveniently provides a real time status and results of checks of files in cloud storage environments for malware.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing malware protection for cloud storage, the method comprising:

providing, by a computing device, an externally deployable malware protection architecture comprising anti-malware engines for malware inspection of one or more files within a cloud storage environment;

testing, by the computing device, to detect when at least one of the files has any malware by executing one or more of the anti-malware engines supported by one or more anti-malware libraries, wherein the testing further comprises;

monitoring, by the computing device, a number of messages in a queue related to the one or more files within a cloud storage environment with respect to two or more thresholds; and adjusting, by the computing device, how many of the anti-malware engines are executed to detect any malware based on the monitored the number of messages with respect to the two or more thresholds, wherein the adjusting adds one or more of the anti-malware engines when the monitored number of messages is above a first of the thresholds, stops one or more of the anti-malware engines when the monitored number of messages is below a second of the thresholds, and maintains the one or more anti-malware engines currently executing when the monitored number of messages is in a range of a number of monitored messages between the first and the second of the thresholds; and executing, by the computing device, at least one of a plurality of actions on the at least one file when the testing indicates the detection of malware in the at least one of the files.

2. The method as set forth in claim 1 wherein the cloud storage malware protection architecture further comprises a separate software container for each of the one or more anti-malware engines for malware inspection of the one or more files within the cloud storage environment and wherein the testing of the at least one file is by the one of the anti-malware engines executing in one of the separate software containers.

3. The method as set forth in claim 1 further comprising:
initiating, by the computing device, an anti-malware library interface to load the one or more anti-malware libraries identified for the at least one file to support the testing by the executing one of the anti-malware engines.

4. The method as set forth in claim 1 further comprising:
initiating, by the computing device, an action interface to load the at least one of the plurality of actions based on the at least one of the files determined to have any malware.

5. The method as set forth in claim 1 further comprising:
providing, by the computing device, an interactive dashboard that displays in real time a testing status of the files, enables a review of any of the files determined to have any malware, and provides an indication of any of the plurality of actions initiated for the one or more files determined to have any malware.

6. The method as set forth in claim 1 wherein the plurality of actions comprise at least one of running an application program interface to initiate a management system associated with one of the files determined to have any malware, running a function associated with one of the files determined to have any malware, or transmitting an electronic message about the malware to a designated endpoint associated with one of the files determined to have any malware.

7. A method for providing malware protection for cloud storage, the method comprising:
providing, by a computing device, an externally deployable malware protection architecture comprising anti-malware engines for malware inspection of one or more files within a cloud storage environment;
testing, by the computing device, to detect when at least one of the files has any malware by executing one or more of the anti-malware engines supported by one or more anti-malware libraries, wherein the testing further comprises;
monitoring, by the computing device, a number of messages in a queue related to the one or more files within a cloud storage environment with respect to one or more thresholds; and
adjusting, by the computing device, how many of the anti-malware engines are executed to detect any malware based on the monitored the number of messages with respect to the one or more thresholds; and
wherein the monitoring and the adjusting further comprises:
determining, by the computing device, when the number of messages in the queue related to the one or more files within the cloud storage environment exceeds a first of the thresholds; and
initiating, by the computing device, execution of another one of the anti-malware engines to test to detect any malware when the determination indicates the number of messages exceeds the first of the thresholds;
executing, by the computing device, at least one of a plurality of actions on the at least one file when the testing indicates the detection of malware in the at least one of the files.

8. A method for providing malware protection for cloud storage, the method comprising:
providing, by a computing device, an externally deployable malware protection architecture comprising anti-malware engines for malware inspection of one or more files within a cloud storage environment;
testing, by the computing device, to detect when at least one of the files has any malware by executing one or more of the anti-malware engines supported by one or more anti-malware libraries, wherein the testing further comprises;
monitoring, by the computing device, a number of messages in a queue related to the one or more files within a cloud storage environment with respect to one or more thresholds; and
adjusting, by the computing device, how many of the anti-malware engines are executed to detect any malware based on the monitored the number of messages with respect to the one or more thresholds; and
wherein the monitoring and the adjusting further comprises:
determining, by the computing device, when the number of messages in the queue related to the one or more files within the cloud storage environment is below a second of the thresholds; and
stopping, by the computing device, the execution of one of the anti-malware engines when the determination indicates the number of messages in the queue is below the second of the thresholds and a number of the executing ones of the anti-malware engines is above a minimum number;
executing, by the computing device, at least one of a plurality of actions on the at least one file when the testing indicates the detection of malware in the at least one of the files.

9. A non-transitory computer readable medium having stored thereon instructions comprising executable code that, when executed by one or more processors, causes the one or more processors to:
provide an externally deployable malware protection architecture comprising anti-malware engines for malware inspection of one or more files within a cloud storage environment;
test to detect when at least one of the files has any malware by executing one or more of the anti-malware engines supported by one or more anti-malware libraries, wherein the test further comprises;
monitor a number of messages in a queue related to the one or more files within a cloud storage environment with respect to two or more thresholds; and
adjust how many of the anti-malware engines are executed to detect any malware based on the monitored the number of messages with respect to the two or more thresholds, wherein the adjust adds one or more of the anti-malware engines when the monitored number of messages is above a first of the thresholds, stops one or more of the anti-malware engines when the monitored number of messages is below a second of the thresholds, and maintains the one or more anti-malware engines executing when the monitored number of messages is in a range of a number of monitored messages between the first and the second of the thresholds; and
execute at least one of a plurality of actions on the at least one file when the testing indicates the detection of malware in the at least one of the files.

10. The non-transitory computer readable medium as set forth in claim 9 wherein the cloud storage malware protection architecture further comprises a separate software container for each of the one or more anti-malware engines for malware inspection of the one or more files within the cloud storage environment and wherein the test of the at least one file is by the one of the anti-malware engines executing in one of the separate software containers.

11. The non-transitory computer readable medium as set forth in claim 9 wherein the executable code, when executed by the one or more processors further causes the one or more processors to:
initiate an anti-malware library interface to load the one or more anti-malware libraries identified for the at least one file to support the test by the executing one of the anti-malware engines.

12. The non-transitory computer readable medium as set forth in claim 9 wherein the executable code, when executed by the one or more processors further causes the one or more processors to:
initiate an action interface to load the at least one of the plurality of actions based on the at least one of the files determined to have any malware.

13. The non-transitory computer readable medium as set forth in claim 9 wherein the executable code, when executed by the one or more processors further causes the one or more processors to:
provide an interactive dashboard that displays in real time a testing status of the files, enables a review of any of the files determined to have any malware, and provides an indication of any of the plurality of actions initiated for the one or more files determined to have any malware.

14. The non-transitory computer readable medium as set forth in claim 9 wherein the plurality of actions comprise at least one of: running an application program interface to initiate a management system associated with one of the files determined to have any malware, running a function associated with one of the files determined to have any malware, or transmitting an electronic message about the malware to a designated endpoint associated with one of the files determined to have any malware.

15. A non-transitory computer readable medium having stored thereon instructions comprising executable code that, when executed by one or more processors, causes the one or more processors to:
provide an externally deployable malware protection architecture comprising anti-malware engines for malware inspection of one or more files within a cloud storage environment;
test to detect when at least one of the files has any malware by executing one or more of the anti-malware engines supported by one or more anti-malware libraries, wherein the test further comprises;
monitor a number of messages in a queue related to the one or more files within a cloud storage environment with respect to one or more thresholds; and
adjust how many of the anti-malware engines are executed to detect any malware based on the monitored the number of messages with respect to the one or more thresholds; and
wherein for the monitor and the adjust, when executed by the one or more processors further causes the one or more processors to:
determine when the number of messages in the queue related to the one or more files within the cloud storage environment exceeds a first of the thresholds; and
initiate execution of another one of the anti-malware engines to test to detect any malware when the determination indicates the number of messages exceeds the first of the thresholds;
execute at least one of a plurality of actions on the at least one file when the testing indicates the detection of malware in the at least one of the files.

16. A non-transitory computer readable medium having stored thereon instructions comprising executable code that, when executed by one or more processors, causes the one or more processors to:
provide an externally deployable malware protection architecture comprising anti-malware engines for malware inspection of one or more files within a cloud storage environment;
test to detect when at least one of the files has any malware by executing one or more of the anti-malware engines supported by one or more anti-malware libraries, wherein the test further comprises;
monitor a number of messages in a queue related to the one or more files within a cloud storage environment with respect to one or more thresholds; and
adjust how many of the anti-malware engines are executed to detect any malware based on the monitored the number of messages with respect to the one or more thresholds; and
wherein for the monitor and the adjust, when executed by the one or more processors further causes the one or more processors to:
determine when the number of messages in the queue related to the one or more files within the cloud storage environment is below a second of the thresholds; and
stop the execution of one of the anti-malware engines when the determination indicates the number of messages in the queue is below the second of the thresholds and a number of the executing ones of the anti-malware engines is above a minimum number;
execute at least one of a plurality of actions on the at least one file when the testing indicates the detection of malware in the at least one of the files.

17. A cloud storage malware detection device comprising memory comprising programmed instructions stored thereon and one or more processors configured to be capable of executing the stored programmed instructions to:
provide an externally deployable malware protection architecture comprising anti-malware engines for malware inspection of one or more files within a cloud storage environment;
test to detect when at least one of the files has any malware by executing one or more of the anti-malware engines supported by one or more anti-malware libraries, wherein the test further comprises;
monitor a number of messages in a queue related to the one or more files within a cloud storage environment with respect to two or more thresholds; and
adjust how many of the anti-malware engines are executed to detect any malware based on the monitored the number of messages with respect to the two or more threshold, wherein the adjust adds one or more of the anti-malware engines when the monitored number of messages is above a first of the thresholds, stops one or more of the anti-malware engines when the monitored number of messages is below a second of the thresholds, and maintains the one or more anti-malware engines executing when the monitored number of messages is in a range of a number of monitored messages between the first and the second of the thresholds; and execute at least one of a plurality of actions on the at least one file when the testing indicates the detection of malware in the at least one of the files.

18. The device as set forth in claim 17 wherein the cloud storage malware protection architecture further comprises a separate software container for each of the one or more anti-malware engines for malware inspection of the one or more files within the cloud storage environment and wherein the test is by the one of the anti-malware engines executing in one of the separate software containers.

19. The device as set forth in claim 17 wherein the one or more processors are further configured to be capable of executing the stored programmed instructions to:
   initiate an anti-malware library interface to load the one or more anti-malware libraries identified for the at least one file to support the testing by the executing one of the anti-malware engines.

20. The device as set forth in claim 17 wherein the one or more processors are further configured to be capable of executing the stored programmed instructions to:
   initiate an action interface to load the at least one of the plurality of actions based on the at least one of the files determined to have any malware.

21. The device as set forth in claim 17 wherein the one or more processors are further configured to be capable of executing the stored programmed instructions to:
   provide an interactive dashboard that displays in real time a testing status of the files, enables a review of any of the files determined to have any malware, and provides an indication of any of the plurality of actions initiated for the one or more files determined to have any malware.

22. The device as set forth in claim 17 wherein the plurality of actions comprise at least one of: running an application program interface to initiate a management system associated with one of the files determined to have any malware, running a function associated with one of the files determined to have any malware, or transmitting an electronic message about the malware to a designated endpoint associated with one of the files determined to have any malware.

23. A cloud storage malware detection device comprising memory comprising programmed instructions stored thereon and one or more processors configured to be capable of executing the stored programmed instructions to:
   provide an externally deployable malware protection architecture comprising anti-malware engines for malware inspection of one or more files within a cloud storage environment;
   test to detect when at least one of the files has any malware by executing one or more of the anti-malware engines supported by one or more anti-malware libraries, wherein the test further comprises;
   monitor a number of messages in a queue related to the one or more files within a cloud storage environment with respect to one or more thresholds; and
   adjust how many of the anti-malware engines are executed to detect any malware based on the monitored the number of messages with respect to the one or more thresholds; and
   wherein for the monitor and the adjust, the one or more processors are further configured to be capable of executing the stored programmed instructions to:
   determine when the number of messages in the queue related to the one or more files within the cloud storage environment exceeds a first of the thresholds; and
   initiate execution of another one of the anti-malware engines to test to detect any malware when the determination indicates the number of messages exceeds the first of the thresholds;
   execute at least one of a plurality of actions on the at least one file when the testing indicates the detection of malware in the at least one of the files.

24. A cloud storage malware detection device comprising memory comprising programmed instructions stored thereon and one or more processors configured to be capable of executing the stored programmed instructions to:
   provide an externally deployable malware protection architecture comprising anti-malware engines for malware inspection of one or more files within a cloud storage environment;
   test to detect when at least one of the files has any malware by executing one or more of the anti-malware engines supported by one or more anti-malware libraries, wherein the test further comprises;
   monitor a number of messages in a queue related to the one or more files within a cloud storage environment with respect to one or more thresholds; and
   adjust how many of the anti-malware engines are executed to detect any malware based on the monitored the number of messages with respect to the one or more thresholds; and
   wherein for the monitor and the adjust, the one or more processors are further configured to be capable of executing the stored programmed instructions to:
   determine when the number of messages in the queue related to the one or more files within the cloud storage environment is below a second of the thresholds; and
   stop the execution of one of the anti-malware engines when the determination indicates the number of messages in the queue is below the second of the thresholds and a number of the executing ones of the anti-malware engines is above a minimum number;
   execute at least one of a plurality of actions on the at least one file when the testing indicates the detection of malware in the at least one of the files.

* * * * *